Oct. 10, 1972

J. M. BILHORN 3,697,328

DUPLEX ELECTRODE CONSTRUCTION USING CONTINUOUS METAL CARRIER
STRIP COATED ON ONE SIDE WITH CONDUCTIVE ADHESIVE

Filed Dec. 21, 1970

United States Patent Office 3,697,328
Patented Oct. 10, 1972

3,697,328
DUPLEX ELECTRODE CONSTRUCTION USING CONTINUOUS METAL CARRIER STRIP COATED ON ONE SIDE WITH CONDUCTIVE ADHESIVE
John M. Bilhorn, Edgerton, Wis., assignor to ESB Incorporated
Filed Dec. 21, 1970, Ser. No. 100,267
Int. Cl. H01m 1/00
U.S. Cl. 136—175    4 Claims

ABSTRACT OF THE DISCLOSURE

A duplex electrode is constructed by first coating one side of a continuous metal carrier strip with electrically conductive adhesive material and then placing intermittent deposits of positive electrode along the coated side of the carrier strip. The duplex electrode is then assembled into a multicell battery where a segment of the metal carrier strip functions as the negative electrode of one cell, the deposit of positive electrode functions as the positive electrode in an adjacent cell, and the deposit of conductive adhesive functions as the intercell connector. The assembly preferably occurs while the duplex electrodes are structurally and electrically connected by the continuous carrier strip after which the carrier strip is subsequently cut between duplex electrodes to obtain structurally and electrically unconnected batteries. Alternatively, the electrodes are assembled into multicell batteries. Preferably, the metal carrier strip is zinc and the positive electrodes comprise manganese dioxide.

BACKGROUND OF THE INVENTION (1) Field of the invention.—This invention concerns a method for making duplex electrodes (also known as bipolar electrodes) in which a continuous metal carrier strip is first coated on one side with an electrically conductive adhesive and then deposits of positive electrodes are intermittently placed on the coated side of the strip. When segments of this strip are subsequently assembled into multicell batteries, the metal strip functions as the positive electrode in an adjacent cell, and the deposit of adhesive functions as the intercell connector.

(2) Description of the prior art.—In the construction of multicell batteries, three essential requirements must be met: a member which is impervious to the electrolyte of the battery must be used between consecutive cells to seal one cell from the next; some means must be provided by which electrical current may be conducted between the positive electrode in one cell and the negative electrode in the other cell; and the electrolyte impervious member and the electrical conductor means must not create any undesired reactions in the battery. Other desirable attributes are that there be low electrical resistances between the positive electrode of one cell and the negative electrode of the next cell and that the battery be constructed using inexpensive materials and methods.

One technique which may be used to assemble multicell batteries is to stack together a collection of individually assembled single cells, placing between the positive electrode of one cell and negative electrode of the next adjacent cell a member which meets all of the three essential requirements set forth above. For such a multicell construction in which the member placed between consecutive cells was adhesive, see U.S. Pat. #2,834,826. Assembly of multicell batteries using this technique is not well suited for use in modern high speed production machinery, however, because of the number of steps required first to assemble each single cell separately and then to assemble a stack or collection to these single cells together in a multicell battery.

Another technique for constructing multicell batteries is with the use of duplex electrodes, also known as bipolar electrodes. A duplex electrode is separately constructed assembly in which as electrolyte impervious, electrochemically nonreactive member which eventually divides one cell from an adjacent cell is surrounded on one side with a positive electrode and on the other side with a negative electrode. After being so assembled, the duplex electrode is subsequently assembled into a multicell battery.

SUMMARY OF THE INVENTION

With this invention, duplex electrodes are constructed by first coating one side of a continuous metal carrier strip with an electrically conductive adhesive and then placing intermittent deposits of positive electrode along the coated side of the carrier strip. The duplex electrode is then assembled into a multicell battery, where a segment of the metal carrier strip functions as the negative electrode in one cell, the deposit of positive electrode functions as the positive electrode in an adjacent cell, and the deposit of conductive adhesive functions as the intercell connector.

Use of the metal carrier strip as a substrate permits the positive electrodes and the intercell connectors to be made from compositions which, during the construction of the duplex electrode, are unable or poorly suited to be produced as continuous strips. The electrically conductive adhesive in the duplex electrode meets all of the three essential requirements stated in the background.

The positive electrodes are applied in intermittent deposits along the coated metal carrier strip. During this construction process, the resulting duplex electrodes are structurally and electrically connected together. The structural connection is desirable because high speed production machinery is better able to receive continuous strips of stock than individual. The electrical connection between duplex electrodes is subsequently broken, either (1) by assembling the continuous carrier strips into structurally and electrically unconnected from each other or (2) by cutting the continuous carrier strips into structurally and electrically unconnected segments each of which is a duplex elecrode and later assembling the segments into multicell batteries.

Preferably, the metal carrier strip is zinc and the positive electrodes comprise manganese dioxide.

BRIEF DESCRIPTION OF THE DRAWINGS

FIG. 4 shows intermittent deposits of positive electrodes in contact with the coated side of the metal carrier strip.

DESCRIPTION OF THE PREFERRED EMBODIMENTS

Figure 1:
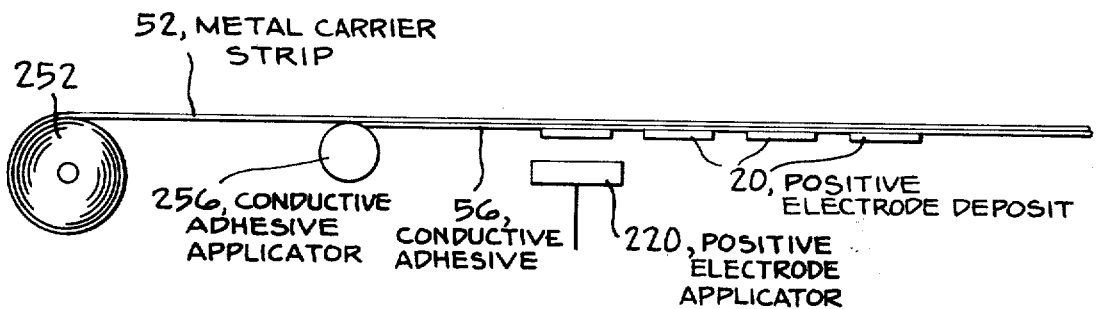
FIG. 1 is a schematic diagram showing a continuous metal carrier strip first being passed by an applicator which applies conductive adhesive onto one side of the metal strip and then being passed by an additional applicator which placed intermittent deposits of positive electrodes in contact with the coated side of the metal carrier strip.
Figure 4:
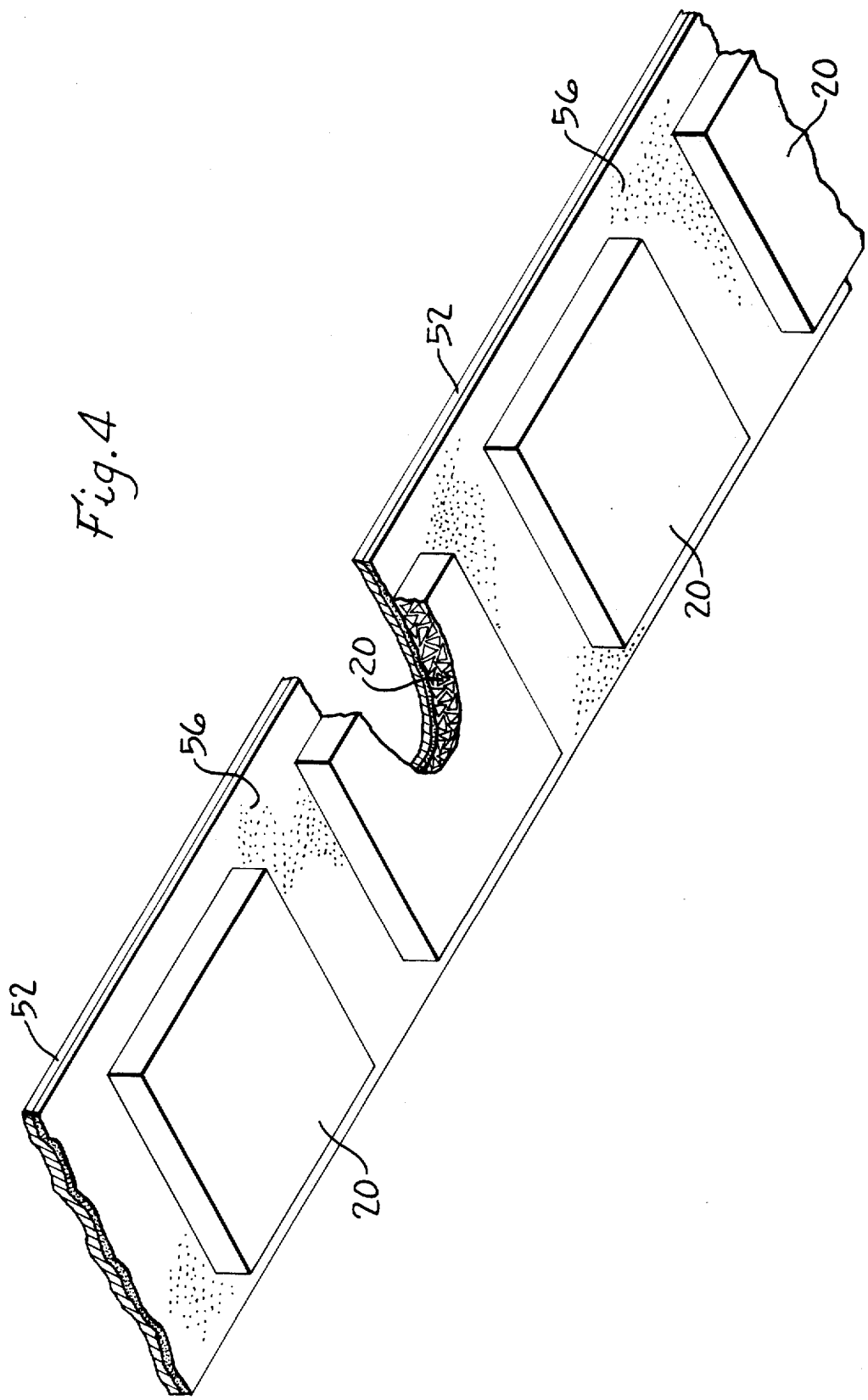
FIG. 4 is an oblique view of a portion of the product resulting from the process of FIG. 1.

FIG. 1 is a schematic diagram showing a continuous metal carrier strip 52 from a roll of some other source of supply 252 being passed by an applicator 256 which applies a coating of a conductive adhesive 56 onto one side of the metal carrier strip. The coated metal strip is subsequently passed by a positive electrode applicator 220 where that applicator places intermittent deposits of positive electrodes 20 along the coated side of the carrier strip. FIG. 4 shows intermittent deposits of positive electrodes in contact with the coated side of the metal carrier strip. It will be understood by those skilled in the art that a segment of the carrier strip, together with a coating of conductive adhesive and a deposit of positive electrode, defines a duplex electrode assembly, also known as a bipolar electrode.

This invention is not limited to specific electrically conductive adhesive materials, for any electrically conductive adhesive material which can be applied in coatings free of pinholes is acceptable. Such materials include pressure sensitive rubber-based or vinyl-based adhesives which are loaded with carbonaceous materials such as graphite or acetylene black or loaded with metallic powders or flakes or needles of such materials as copper or silver. Alternatively, the adhesive base may be thermosensitive and include such materials as vinyl copolymers and/or rubbers or ethylene vinyl acetate or a mixture of the latter with waxes. Polymers which by themselves are sufficiently conductive may also be used. Likewise, this invention is not limited to the manner in which the coating of electrically conductive adhesive is applied to the carrier strip, such techniques as printing, rolling, brushing, spraying, or dipping being illustrative of the methods which might be used. The applicator 256 shown in FIG. 1 is intended to represent applicators in general. Also, while FIG. 1 shows the coating of adhesive being applied continuously along the carrier strip, intermittent rather than continuous deposits of the adhesive may also be used if the resultant uncoated segments of the metal carrier strip are, when subsequently assembled into multicell batteries, positioned in the battery so that they are not allowed to come into communication with the battery's electrolyte.

Just as the applicator 256 is intended to represent in general all applicating devices which may be used to apply adhesive to the carrier strip, so also the applicator 220 shown in FIG. 1 is intended to represent in general all applicating devices which may be used to place intermittent deposits of positive electrodes 20 along the coated strip.

As can be seen from FIG. 1, the duplex electrode assemblies are structurally and electrically connected together immediately after the carrier strip passes by the second of the two applicators. At some subsequent step in the construction of separate multicell batteries, these physical and electrical connections between duplex electrode assemblies must be broken.

Figure 2:
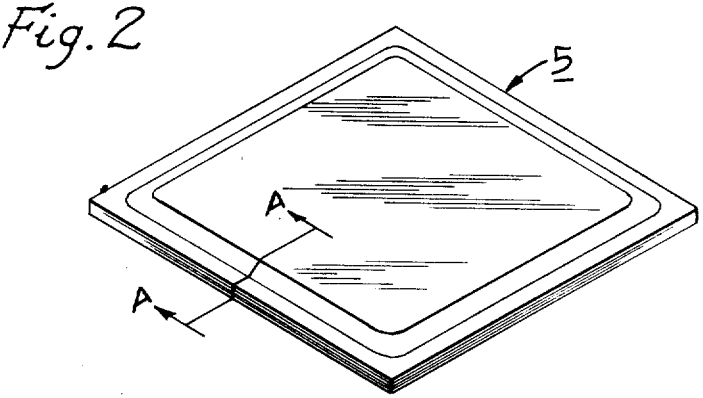
FIG. 2 is an oblique view of a multicell battery containing duplex electrodes made according to this invention.
Figure 3:
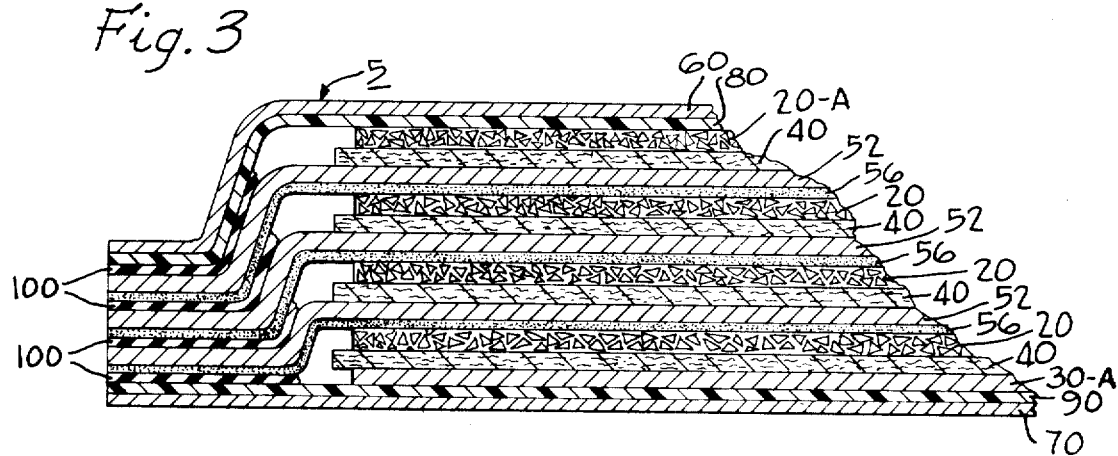
FIG. 3 illustrates a cross-section of the battery shown in FIG. 2 taken along the line A—A of FIG. 2. The thickness of the battery is shown greatly magnified for purposes of illustration.

The eventual multicell battery product is the same whether the duplex electrodes constructed as shown in FIG. 1 are assembled into multicell batteries before or after being structurally and electrically unconnected from each other. FIG. 2 shows such a multicell battery 5 in an oblique view. FIG. 3 shows a portion of the multicell battery 5 in magnified cross-section. As FIG. 3 shows, the battery 5 comprises the combination of an outer positive electrode 20-A, an outer negative electrode 30-A, and at least one duplex electrode between outer electrodes 20-A and 30-A, each duplex electrode being of the type constructed by the method shown in FIG. 1. The outer negative electrode 30-A may be an uncoated segment of the same metal as is used in the continuous carrier strip. As shown in FIG. 3, a duplex electrode comprises the combination of a segment of metal carrier strip 52 which functions as the negative electrode of the duplex electrode, the conductive adhesive 56 which functions as the intercell connector, and a deposit of positive electrode 20 on the coated side of the segment. The multicell battery 5 also includes an electrolyte impregnated separator 40 between each positive electrode 20 and 20-A and each negative electrode 30 and 30-A. Liquid impervious layers 80 and 90 which also function as current conducting means are in contact with the outer electrodes 20-A and 30-A, respectively. Metal current collectors 60 and 70 which also function as vapor barriers are on the outside of layers 80 and 90. Electrolyte impervious sealing means and electrical insulating means around the electrolyte impregnated separators 40 are designated by the numeral 100.

Numerous advantages result from the construction illustrated schematically in FIG. 1 and described above. Use of the carrier strip as a substrate permits the positive electrodes and the intercell connectors to be made from compositions which, during the construction of the duplex electrodes are unable or poorly suited to function as a carrier strip. Examples of positive electrodes which are unable or poorly suited to function as a carrier strip include electrodes comprising particles of active material contained in and dispersed throughout a porous matrix, flame spray deposits; and vapor deposits.

The conductive adhesive 56 meets all three of the essential requirements stated in the background, since it is impervious to electrolyte, it is electrically conductive, and it does not produce any unwanted electrochemical reactions with either the segment of the metal carrier strip or the positive electrode.

The use of the continuous carrier strip as a substrate along which intermittent deposits of electrodes are applied is also advantageous from the viewpoint of manufacturing techniques. Modern, high speed production machinery is better able to supply such deposits along a continuous strip than to apply deposits to a succession of individual pieces. Maximum advantage of this principle may be attained in conjunction with this invention by using the continuous strip as a processing implement throughout the construction of the multicell batteries, leaving the step of cutting the carrier strip into segments until all other assembly steps required to construct the multicell batteries have been taken. In this regard, it is preferred to assemble a plurality of structurally and electrically unconnected multicell batteries by beginning with the construction of duplex electrodes which are structurally and electrically connected together along the continuous, coated metal carrier strip. This consists of placing intermittent deposits of positive electrodes along the coated side of the metal carrier strip as shown in FIG. 1. The next step in the preferred assembly process consists of assembling multicell batteries which are structurally and electrically connected together by at least one of the carrier strips having positive electrodes deposited thereon, a step which comprises the acts of: placing at least one such carrier strip between outer positive and outer negative electrodes so that each duplex electrode is between an outer positive electrode and an outer negative electrode; placing an electrolyte impregnated separator between each positive and negative electrode; sealing around the perimeter of each electrolyte impregnated separator to produce a liquid impervious seal; sealing a liquid impervious layer around the electrodes and electrolyte impregnated separators; and, connecting to each outer positive electrode electrically conductive means which extend to the exterior of the liquid impervious layer and connecting to each outer negative electrode additional electrically conductive means which extend to the exterior of the liquid impervious layer. After the multicell batteries have been so assembled, each carrier strip is then cut between duplex electrodes to obtain structurally and electrically unconnected multicell batteries; the carrier strip may be cut between each successive pair of duplex electrodes, or it may be cut into increments each of which contains two or more duplex electrodes so that the resultant batteries structurally connected by the increment are electrically connected in parallel. During the assembly of the multicell batteries, additional components of the multicell batteries may be processed in the form of continuous strips; alternatively, each of these additional components may also comprise a succession of structurally unconnected components placed along the continuous coated metal carrier strip.

FIG. 3 is helpful in illustrating these concepts. The multicell battery 5 shown in FIG. 3 may be made by using three of the coated metal carrier strips 52 with positive electrodes 20 applied intermittently on the conductive adhesive 56. The electrolyte impregnated separators 40 shown in FIG. 3 were assembled into the battery as structurally unconnected components. The components 60, 70, 80 and 90 were assembled into the multicell battery 5 as continuous strips, although they also could have been components which have no structural connection with each other when assembled into successive multicell batteries. The cutting of the three coated metal carrier strips plus the cutting of any other continuous strips used in constructing the multicell battery 5 may be the last step in the construction of a plurality of multicell batteries, thereby retaining the advantages of processing continuous strips rather than individual unconnected pieces for as much of the assembly process as is possible.

It is not essential that the cutting of the continuous, coated metal carrier strip into structurally and electrically unconnected duplex electrodes be postponed until all other steps in the assembly of multicell batteries are complete. The cutting of the strips may, for instance, be done immediately after the positive and negative electrodes are applied intermittently on opposite sides of the carrier strips and the unconnected duplex electrodes may then be assembled into multicell batteries. If this sequence of steps is taken, then the assembly of a multicell battery after the cutting of the carrier strip comprises: placing at least one of the structurally and electrically unconnected duplex electrodes between an outer positive electrode and an outer negative electrode; placing an electrolyte impregnated separator between each positive and negative electrode; sealing around the perimeter of each electrolyte impregnated separator to produce a liquid impervious seal; sealing a liquid impervious layer around the electrodes and electrolyte impregnated separators; and, connecting to the outer positive electrode electrically conductive means which extend to the exterior of the liquid impervious layer and connecting to the outer negative electrode additional electrically conductive means which extend to the exterior of the liquid impervious layer. The unconnected duplex electrodes could be assembled into multicell batteries as described above in a process in which some other member of the finally constructed batteries was used in the form of a continuous carrier strip during some or all of the assembly steps; for instance, the outside layers could be continuous carrier strips and the duplex electrodes, electrolyte impregnated separators, and outer electrodes could then be placed along those continuous strips, with the cutting of those strips to produce structurally unconnected multicell batteries being postponed until after all other assembly steps have been concluded.

The composition of each of several of the members in the battery may take alternative forms, and the compositions of those members will now be discussed.

The positive electrodes 20 and 20–A may each comprise particles of electrochemically positive active material contained in and dispersed throughout a binder matrix. The positive active material conventionally is divided into tiny particles so as to increase the ratio of total surface area to weight in the active material and thereby increase the rate at which the electrochemical reactions can occur by increasing the surface areas where they occur. The binder increases the internal electronic conductivity of the duplex electrodes and increases the structural integrity within the positive electrodes. Since electrolyte must have access to the surface of the active material particles, the electrode must be made sufficiently porous so that the electrolyte may diffuse throughout the electrode rapidly and thoroughly. Preferably, the pores in the electrode are produced by the evaporation of liquid during the construction of the electrode; the evaporating liquid may be part of a dispersion binder system in which the solid contained in the finally constructed electrode comprises tiny particles of binder material dispersed throughout and not dissolved in the liquid while the electrode is being constructed, or the evaporating liquid may be part of a solution binder system in which the solid binder contained in the finally constructed electrode is dissolved in the liquid which is later evaporated. The porosity of the positive electrodes may be increased as the discharge rate desired in the battery is increased. Electrodes may also be constructed using combinations of the dispersion and solution systems. Alternatively, the pores might be produced by the dissolving of a solid which was present during construction of the electrode or by passing gases through or generating gases within the electrodes at controlled rates during electrode construction. The positive electrodes 20 and 20–A may, and preferably will, also contain amounts of a good electrical conductor such as carbon or graphite to improve the electrical conductivity between the active material particles, the positive active material particles themselves generally being relatively poor conductors of electricity. The conductivity of the active material particles together with the conductivity of the binder itself will influence the amounts of conductors added to the electrode. The electrodes 20 and 20–A may also contain, if desired, small amounts of additional ingredients used for such purposes as maintaining uniform dispersion of active material particles during electrode construction, aiding the diffusion of electrolyte through the pores of the finally constructed electrodes, controlling viscosity during processing, controlling surface tension, controlling pot life, or for other reasons.

It is apparent that positive electrodes which comprise particles of active material would be unable or poorly suited to be produced as continuous strips, and the same is true of the conductive adhesive. Both should therefore be deposited upon a substrate which, in the case of this invention, is the coated metal carrier strip.

Another reason for preferring the positive electrodes 20 and 20–A to comprise particles of manganese dioxide and the metal carrier strip to comprise zinc is that the electrodes of these descriptions may be used in both the Leclanché and the alkaline manganese electrochemical systems. While these two systems employ the same active materials, they use different electrolytes, the electrolyte in the Leclanché substantially comprising an acidic solution of ammonium chloride and/or zinc chloride while in the alkaline manganese system, the electrolyte substantially comprises a solution of potassium hydroxide. In both systems, it is customery to confine the manganese dioxide particles in a binder matrix.

Between each positive electrode 20 or 20–A and each negative 30 or 30–A is an electrolyte impregnated separator 40, the theoretical requirements of which are that it contain electrolyte as well as physically separate and prevent contact between the surrounding electrodes. A deposit of gelled electrolyte could by itself serve both functions if of proper thickness and/or consistency. The alternative construction uses a deposit of gelled or fluid electrolyte with a separator which is distinct from and in addition to the electrolyte, the separator providing added insurance against direct contact between the electrodes and acting as an absorbent material into which the electrolyte may be impregnated. Both alternative constructions may, however, be viewed as being forms of electrolyte impregnated separators. Where the separator is distinct from and in addition to the electrolyte, the separator may be made from a wide variety of materials including the fibrous and cellulosic materials which are conventional in battery constructions as well as from woven or non-woven fibrous materials such as polyester, nylon, polypropylene, polyethylene, and glass.

Another essential of the multicell battery 5 is a liquid impervious layer comprising members 80 and 90 sealed around the electrodes and electrolyte impregnated separators as shown in FIG. 3. When a battery is in storage waiting to be placed into service there is an opportunity for liquids from the electrolyte to escape from the battery, leaving the battery incapable of performing as desired when later placed into use. Also, during discharge the battery may produce liquid byproducts which are corrosive, poisonous, or otherwise harmful, and it is desirable to prevent these liquids from escaping from the battery. The liquid impervious layer provides means for preventing or minimizing the loss of these liquids.

The multicell battery 5 must also be provided with means for conducting electrical current between the outer positive electrode 20–A and the exterior of the liquid impervious layer and additional means for conducting electrical current between the outer negative electrode 30–A and the exterior of the liquid impervious layer. This additional rquirement of the battery may be met by the liquid impervious layer members 80 and 90 themselves by constructing those members from a conductive material such as an electrochemically inert, electrically conductive plastic, and such a construction is shown in FIG. 3. As an alternative to the conductive plastic, metals which are either themselves electrochemically nonreactive or are made so by appropriate conductive, nonreactive coatings may be used for the liquid impervious layer. Another alternative construction not illustrated in the drawings is to use a liquid impervious layer which is made from an electrically nonconductive material and then extend separate conductive means from the end electrodes 20–A and 30–A through or around the edge of the nonconductive, liquid impervious layer so that current may be withdrawn from the battery. It is to be understood that all of these alternative constructions are encompassed by the general statement that a liquid impervious layer is sealed around the electrodes and electrolyte impregnated separators, that electrically conductive means are connected to the outer positive electrode 20–A which extend to the exterior of the liquid impervious layer, and that additional electrically conductive means are connected to the outer negative electrode 30–A which extend to the exterior of the liquid impervious layer.

Two additional components, members 60 and 70, are shown in FIG. 3 and are illustrated because they may be used in the construction of the multicell battery produced by this invention. It should be understood, however, that the present invention does not require the use of members 60 and 70. Those members are metal foils or sheets, e.g., steel foil, which function both as vapor barriers to prevent evaporation of electrolyte from the battery and as current collecting means. Where a nonmetallic, nonconductive vapor barrier is used instead of steel foil, additional means must be provided to conduct current from the exterior of the liquid impervious layer (members 80 and 90) to the exterior of the vapor barrier. Where vapor barriers such as the members 60 and 70 shown in FIG. 3 are used with the battery, they may be laminated to the liquid impervious layers 80 and 90 if desired.

Electrically nonconductive, moisture impervious sealing means must be provided around the peripheral faces of the carrier strip segments to prevent electrolyte loss from the battery and to prevent the electrolyte of one cell from migrating to another cell around the perimeter of an intercell connector. Such sealing means are generally represented by the sealers 100 shown in FIG. 3, but this invention is otherwise not concerned with those sealers.

While it is preferred to use a zinc carrier strip, manganese dioxide positive electrodes, and the electrolyte of either the Leclanché or alkaline manganese systems in this invention, other materials and systems may also be used in suitable cases. For example, a lead foil could be used as the carrier strip with positive electrodes comprising oxides of lead and with sulfuric acid to produce batteries of the lead-acid system.

I claim:

1. The method of constructing structurally and electrically unconnected multicell batteries comprising the steps of:

(a) constructing duplex electrodes which are structurally and electrically connected together along a continuous metal carrier strip coated on one side side with conductive adhesive, each duplex electrode comprising a segment of the coated strip and a positive electrode on the coated side of that segment, the method of constructing the duplex electrodes comprising placing intermittent deposits of a positive electrode along the coated side of the carrier strip; then, (b) assembling multicell batteries which are structurally and electrically connected together by at least one of the coated carrier strips having positive electrodes deposited thereon, the method of assembling the multicell batteries comprising the steps of
        (i) placing at least one of the coated carrier strips with the positive electrodes deposited thereon between outer positive electrodes and outer negative electrodes so that each duplex electrode is between an outer positive electrode and an outer negative electrode,
        (ii) placing an electrolyte impregnated separator between each positive and negative electrode,
        (iii) placing a liquid impervious layer over said outer electrodes,
        (iv) sealing around the perimeters of each duplex electrode and said liquid impervious layer to produce a liquid impervious seal around the perimeter of each multicell battery,
        (v) connecting to each outer positive electrode electrically conductive means which extend to the exterior of the liquid impervious layer and connecting to each outer negative electrode additional electrically conductive means which extend the exterior of the liquid impervious layer; and then, (c) cutting each carrier strip between duplex electrodes to obtain structurally and electrically unconnected multicell batteries.

2. The method of claim 1 in which the metal carrier strip is zinc, in which the outer negative electrode comprises zinc, and in which the positive electrodes placed along the conductive adhesive and the outer positive electrode comprise manganese dioxide.

3. The method of constructing a multicell battery comprising the steps of:

(a) constructing duplex electrodes which are structurally and electrically connected together along a continuous metal carrier strip coated on one side side with conductive adhesive, each duplex electrode comprising a segment of the coated strip and a positive electrode on the coated side of that segment, the method of constructing the duplex electrodes comprising placing intermittent deposits of a positive electrode along the coated side of the carrier strip; then, (b) cutting each carrier strip between duplex electrodes to obtain structurally and electrically unconnected duplex electrodes; and then, (c) assembling a multicell battery by
        (i) placing at least one of the structurally and electrically unconnected duplex electrodes between an outer positive electrode and an outer negative electrode,
        (ii) placing an electrolyte impregnated separator between each positive and negative electrode,
        (iii) placing a liquid impervious layer over said outer electrodes,
        (iv) sealing around the perimeter of said duplex electrode and said liquid impervious layer to produce a liquid impervious seal around the perimeter of said multicell battery, and
        (v) connecting to the outer positive electrode electrically conductive means which extend to the exterior of the liquid impervious layer and connecting to the outer negative electrode additional electrically conductive means which extend to the exterior of the liquid impervious layer.

4. The method of claim 3 in which the metal carrier strip is zinc, in which the outer negative electrode assembly comprises zinc, and in which the positive electrodes placed along the conductive adhesive and the outer positive electrode both comprise manganese dioxide.

References Cited

UNITED STATES PATENTS

| | | | |
|---|---|---|---|
| 3,563,805 | 2/1971 | Deierhoi | 136—111 |
| 2,844,641 | 7/1958 | Lang et al. | 136—175 |
| 2,519,054 | 8/1950 | Woodring | 136—111 |
| 3,004,093 | 10/1961 | Richter et al. | 136—175 |

DONALD L. WALTON, Primary Examiner

U.S. Cl. X.R.

136—111